United States Patent [19]
Martin

[11] Patent Number: 6,089,746
[45] Date of Patent: Jul. 18, 2000

[54] HOUSEHOLD FOOD PREPARATION APPLIANCE SUCH AS A MULTI-FUNCTION FOOD PROCESSOR COMPRISING A BEARING MEANS FOR THE ROTARY WORKING ASSEMBLY

[75] Inventor: Guy Martin, Louey, France

[73] Assignee: SEB S.A., Ecully, France

[21] Appl. No.: 09/117,027

[22] PCT Filed: Jan. 23, 1997

[86] PCT No.: PCT/FR97/00135

§ 371 Date: Jul. 22, 1998

§ 102(e) Date: Jul. 22, 1998

[87] PCT Pub. No.: WO97/26817

PCT Pub. Date: Jul. 31, 1997

[30] Foreign Application Priority Data

Jan. 24, 1996 [FR] France ................................. 96 01023

[51] Int. Cl.[7] .......................... A47J 43/044; A47J 43/07; A47J 43/10
[52] U.S. Cl. ............................. 366/129; 366/331
[58] Field of Search .................... 366/129, 130, 366/331, 342, 343; 99/348; 416/69, 70 R, 76, 77

[56] References Cited

U.S. PATENT DOCUMENTS

| 688,201 | 12/1901 | Scopes . | |
|---|---|---|---|
| 775,102 | 11/1904 | Dudley . | |
| 845,341 | 2/1907 | Dunlap | 366/129 |
| 846,661 | 3/1907 | Godward | 366/129 |
| 1,217,832 | 2/1917 | Saito | 366/129 |
| 1,519,533 | 12/1924 | Dingle . | |
| 1,627,314 | 5/1927 | Boynton | 366/129 |
| 1,627,315 | 5/1927 | Boynton | 366/129 |
| 2,027,297 | 1/1936 | Tramposch | 366/605 |
| 2,509,706 | 5/1950 | Szerenyi . | |
| 2,715,519 | 8/1955 | Schwalbe | 366/129 |
| 2,858,117 | 10/1958 | Girton | 366/331 |
| 4,813,624 | 3/1989 | Williams . | |
| 4,850,699 | 7/1989 | Rebordosa | 366/331 |
| 5,810,472 | 9/1998 | Penaranda et al. | 366/129 |

FOREIGN PATENT DOCUMENTS

| 2 642 294 | 8/1990 | France . |
| 1 420 840 | 3/1996 | France . |
| 382 060 | 9/1923 | Germany . |

*Primary Examiner*—Charles E. Cooley
*Attorney, Agent, or Firm*—Pillsbury Madison & Sutro

[57] ABSTRACT

A household food preparation appliance composed of: a working container (1) having a bottom wall (3); a rotary working assembly (5, 6, 7) driven by a motor unit; and a bearing member secured to, and freely rotatable in relation to, the working assembly. The working assembly is composed of a drive shaft (5) capable of supporting a working attachment (7) and is capable of being positioned in the container (1) with the bearing member substantially against the bottom wall (3) of the container (1). The bearing member (8) forms an element for centering the shaft (5) relative to the bottom wall (3).

21 Claims, 3 Drawing Sheets

6,089,746

HOUSEHOLD FOOD PREPARATION APPLIANCE SUCH AS A MULTI-FUNCTION FOOD PROCESSOR COMPRISING A BEARING MEANS FOR THE ROTARY WORKING ASSEMBLY

TECHNICAL FIELD

The present invention relates to the general technical field of household food preparation appliances, of the multi-function or multi-purpose type or even mini or multi-choppers provided with a rotatable working attachment capable of being positionable against the bottom of a container.

The present invention concerns a household food preparation appliance, of the multi-purpose food processor type, comprising a working container and a rotary working assembly including a motor unit with a drive shaft capable of carrying a working attachment, said assembly being capable of being positionable in the container, substantially against the bottom of said container, in association with a bearing means.

In the framework of the invention it is in order to understand by the term household food preparation appliance, of the multi-purpose food processor type, all electrical appliances of which the rotatable working attachment should be disposed in a container substantially bearing against the bottom in a manner to be able to assume the function assigned to the attachment, and this independently of the type of attachment utilized, from the instant that it is in rotation in the container. Consequently, the term food preparation appliance takes on, in the context of the invention, a broad meaning including various appliances not limited by their food preparation function which can consist by way of non-limiting example in chopping, mixing, grinding, emulsifying, etc.

PRIOR ART

Such appliances are for example described in the patent application FR-A2642294 which refers to a cutter-mixer appliance for food preparation. The appliance described comprises a bowl in which can be provided a rotatable working assembly including a motor unit driving in rotation a drive shaft on which is mounted, in a removable or non-removable manner, a working attachment, or tool, such as a blade. In the working position, the drive shaft is positioned in the bowl, its extremity coming to rest by bearing against this latter. In a conventional manner, it is envisioned in order to permit centering and rotation of the working attachment, in this case the blade, to provide, to integrate in the bottom of the bowl, for example by overmoulding, a fixed shaft extending axially starting from the bottom and from the center of this same bowl. In this manner, the drive shaft and the attachment can bear against this shaft, which permits centering and rotational support for the attachment. Such technique is widely used in most small household food preparation appliances.

The drawbacks of this solution are linked to the difficulty of cleaning the bowl, since it has at its bottom and at its center an insert generally made of metal interfering particularly with a good cleaning but being able equally to be the source of bacterial proliferation. Moreover, the presence of an insert or metal shaft prevents the utilization of the bowls in conventional or microwave ovens, which is often perceived by consumers to be a negative limitation on utilization. The insert affects the ergonomics of the bowl and renders it difficult to use them for serving by interfering with the displacement of utensils at the bottom of the bowl. Finally, on the industrial scale, positioning of the metal insert constitutes an additional step in a fabrication process leading to a cost increase.

An appliance according to the prior art is known from the document U.S. Pat. No. 4,813,624.

SUMMARY OF THE INVENTION

The object of the invention aims consequently at providing a solution to the different drawbacks listed previously and in furnishing a household food preparation appliance having a simplified general design, without at the same time limiting its ease of utilization.

The form and the nature of the materials aid moreover the damping of vibrations caused by high rotational speeds.

Another object of the invention is to provide a household food preparation appliance which is particularly easy to use.

Another object of the invention is to provide a household food preparation appliance which is easy to handle, and this with the aid of means which are particularly simple and time-tested.

The objects assigned to the invention are achieved with the aid of a household food preparation appliance of the multi-function (or multi-purpose) food processor type comprising a working container and a rotary working assembly driven by a motor unit with a drive shaft arranged to carry a working attachment, said assembly being capable of being positioned in the container substantially against the bottom of said container in association with a support means fixed to said assembly, characterized in that the support means is mounted to rotate freely with respect to the working assembly.

BRIEF DESCRIPTION OF THE DRAWINGS

Other advantages and particularities of the invention will become more readily apparent from the description given below, with reference to the attached drawings which show by way of non-limiting examples embodiments of the object of the invention in which.

PREFERRED MANNER OF PRACTICING THE INVENTION

Figure 1:
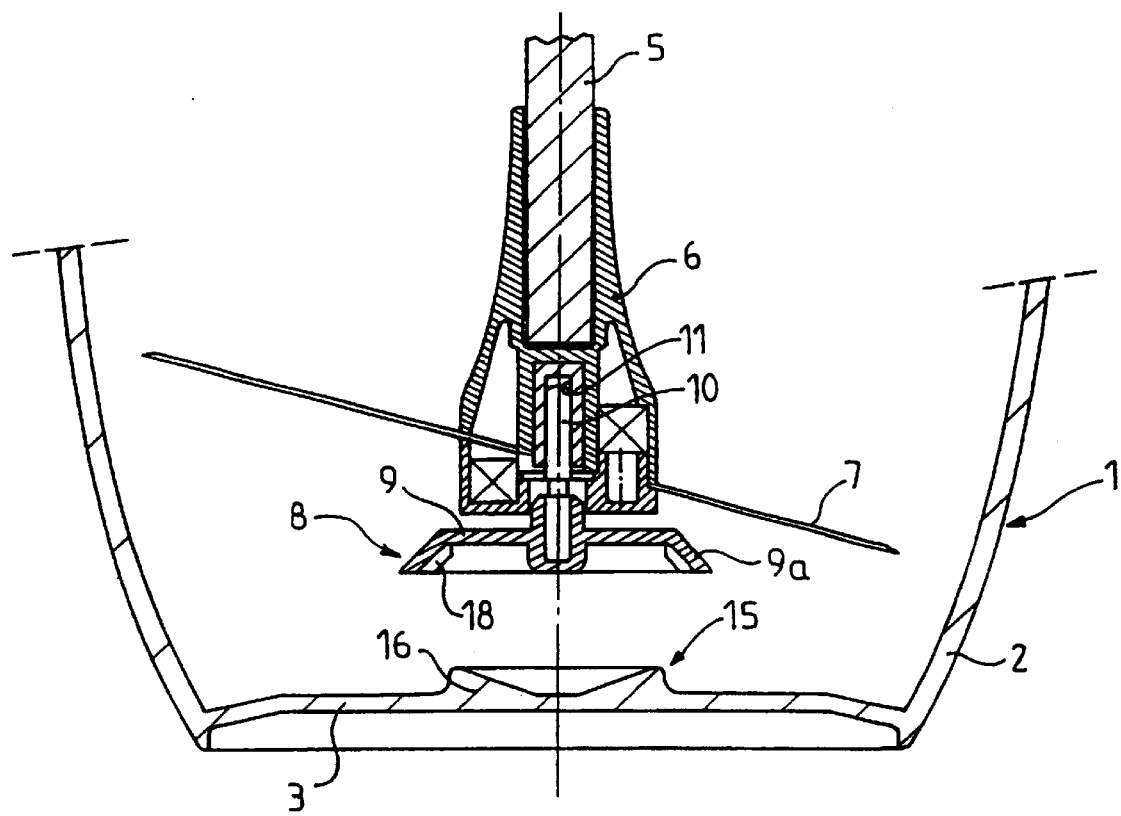
FIG. 1 shows in a partial longitudinal transverse cross section a detail of a household food preparation appliance according to the invention showing the working attachment in a withdrawn position in a working container.
Figure 2:
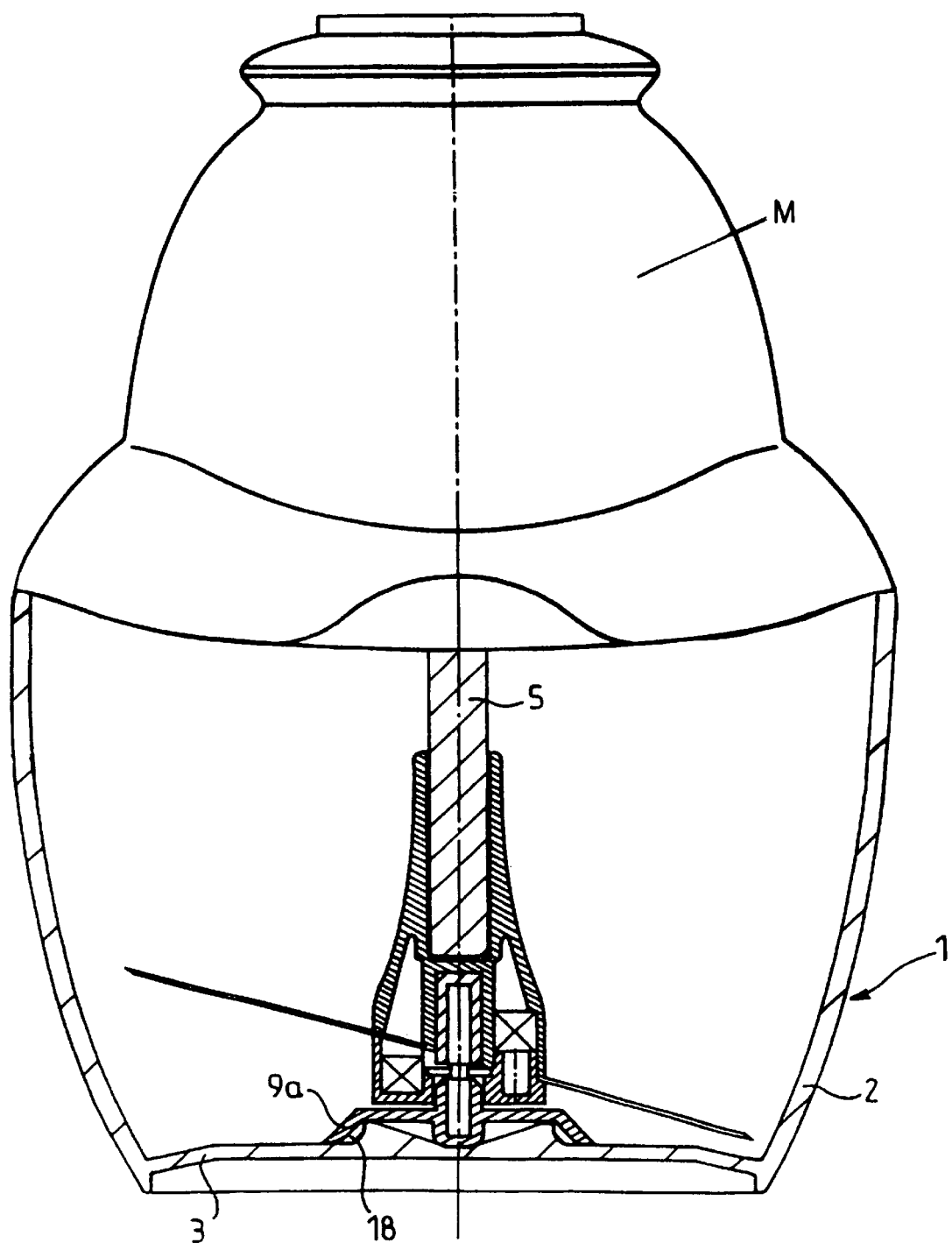
FIG. 2 shows according to a longitudinal transverse cross section identical to FIG. 1, a household food preparation appliance according to the invention in which the working attachment is in the working position against the bottom of the container.

FIGS. 1 and 2 show in partial views a household food preparation appliance of the mini- or multi-chopper type for example, according to the invention. The appliance comprises a working container 1, shown partially, and made of any material. In an advantageous manner, the container 1 is made of any material permitting its utilization in a microwave oven, such as materials based on plastic or of glass.

The container 1 is of any appropriate form, and for example substantially cylindrical and is delimited to the outside by lateral walls 2 and a bottom wall 3.

The household appliance shown in a partial manner in FIGS. 1 and 2 also comprises a lid as well as an electric motor unit M mounted with the lid in a removable or non-removable manner. The motor unit is secured to a drive shaft 5 whose free end is fixed, for example by fitting, to a hub 6 arranged to carry a working attachment 7, for example a blade. The drive shaft 5 forms with the hub 6 and the working attachment 7 a rotary working assembly capable of being positioned in the container 1 substantially against the bottom wall 3.

According to an important characteristic of the invention, the working assembly is capable of being placed in contact against the bottom wall 3 in association with a bearing means 8 which is secured to the working assembly and freely rotatable in relation thereto.

According to a preferred version of the invention, the bearing means 8 is formed by a base 9, comparable for example to a disk, preferably substantially circular and freely rotatable at the extremity of the working assembly by the intermediary of a journal 10.

According to an advantageous version of the invention, the journal 10 is secured by one extremity to the base 9, and for example force fitted into a central orifice of this latter, and journaled by its other extremity in a central bore 11 formed in the hub 6. According to this arrangement, the guidance in rotation of the base 9 is achieved by the journal 10.

To improve the adherence capability of the base 9 on the bottom wall 3, the material utilized to form the base 9 can be based on any material aiding adherence, for example, a plastic material which is silicone based.

According to another advantageous variation of the invention, the bearing means 8 equally forms a means for centering the rotary working assembly, and particular the drive shaft 5 relative to the bottom wall 3. This characteristic particularly aids the anti-vibration behavior of the appliance.

Figure 3:
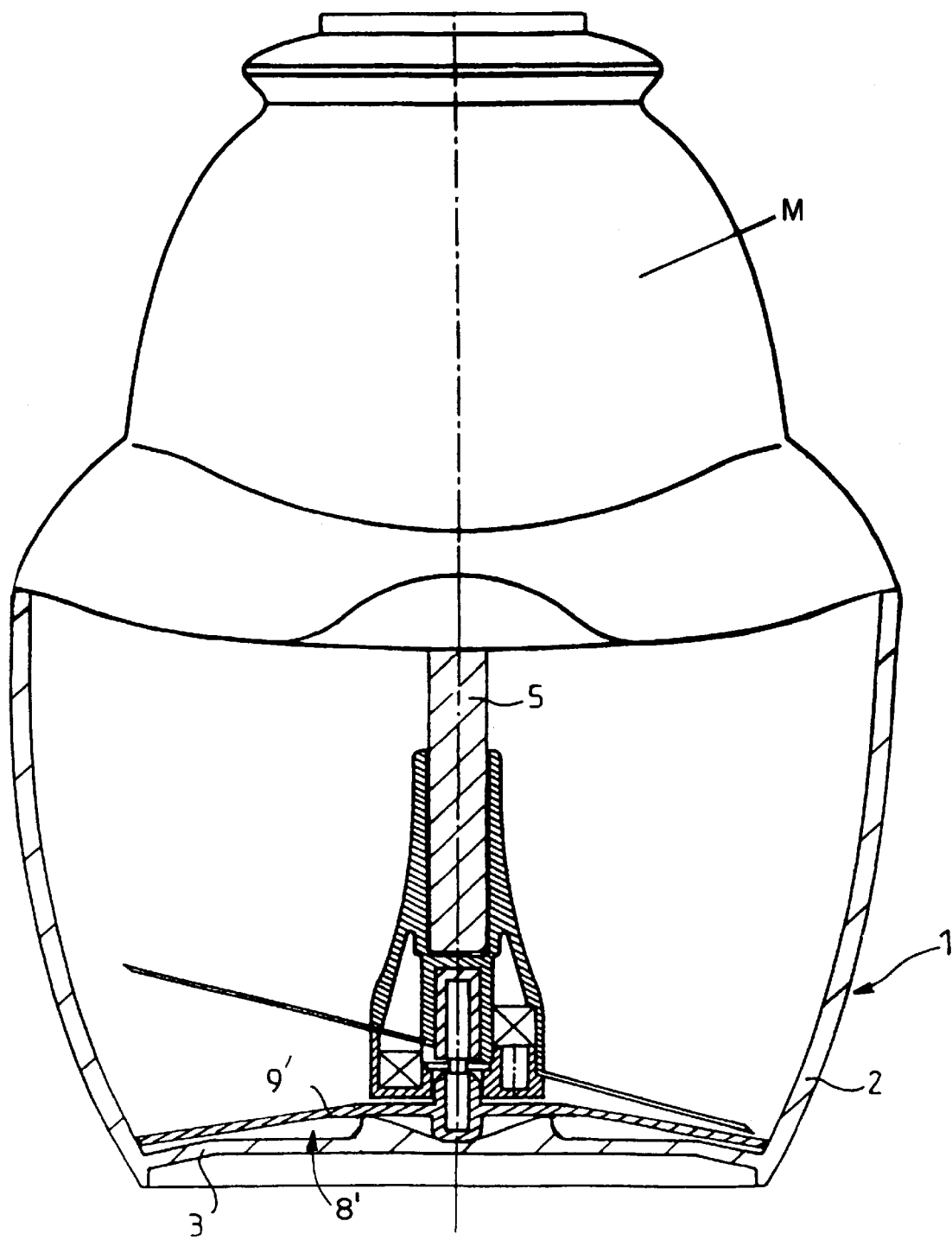
FIG. 3 is a view similar to that of FIG. 2 showing another embodiment of the invention.

According to an advantageous version of the invention shown in FIG. 3, the bearing means 8' can constitute a centering means in association with at least one part of the lateral walls 2 of the container 1. In such an embodiment, the exterior diameter of the base 9' is substantially equal to the diameter of the bottom wall 3 in a manner to permit the base 9' to be guided at least in part against the lateral walls 2 during positioning of the working assembly in the container 1. A same bearing means 8' can thus serve for several containers having different diameters, for example, for a small diameter, the bearing means extending up to the walls 2 while for a container of large diameter, the same bearing means corresponds substantially to the central portion of the container.

According to the embodiment shown in FIGS. 1 and 2, the bearing means 8 forms a centering means in association with a shaped portion 15 formed in the bottom wall 3 and whose shape is adapted to facilitate centering of the bearing means 8. According to this embodiment, the shaped portion 15 is formed by a ring 16, preferably an integral part of bottom wall 3, preferably different in height and projecting in the central position with respect to the bottom wall 3 and in its general plane of extension. In the preferred version shown in FIGS. 1 and 2, the ring 16 presents at its center a cavity, or a concave recess. In a manner to facilitate centering of the base 9 on the ring 16, the base 9 is provided at its periphery with a skirt 9a forming a downwardly extending peripheral edge, intended to come to fit together and mate with the external periphery of the ring 16. Advantageously, the internal face of the base 9 is provided, preferably at the internal face of the skirt 9a, with a series of longitudinal notches 18 intended to increase the adherence on the bottom wall 3, in particular on the ring 16. In such a case, the diameter of the ring 16 is substantially identical to the internal diameter of the lower face of the base 9 so that this latter can come to be blocked in a fixed position on the ring by being fitted thereto.

The mode of operation of the appliance according to the invention is the following.

After having filled the container 1 with ingredients to be treated (meat, vegetables, fruit, etc . . . ), the user puts the working assembly in place in the container such as shown in FIG. 1 and closes the container with the aid of the lid. The working assembly is then progressively lowered substantially axially into the container until the base 9 comes in contact with the bottom wall 3. The guidance and centering of the working assembly are aided by the progressive fitting of the skirt 9a on the ring 16 the dimensions and profile of which are adapted or conjugate. When the base 9 is against the bottom wall 3, the working assembly is perfectly positioned and centered in the container and the user can place the appliance in operation.

During rotation of the drive shaft 5, the base 9 is fixed on the bottom wall 3 and blocked in rotation by simple adherence and pressure while the working attachment 7 is in rotation. The utilization of the appliance and the positioning of the rotary working assembly are consequently particularly simplified due to the natural progressivity of the centering of the base 9 on the ring 16.

In addition, the suppression of all means, in particular metallic, for centering fixed to the container 1 permits this latter to be utilized in microwave ovens. This permits eliminating all intermediate steps of assembly, disassembly and decanting of products which have been treated in the container 1. The aesthetic aspect of a container that does not have a metal insert is also appreciable, while also facilitating cleaning.

POSSIBILITIES OF INDUSTRIAL APPLICATION

The invention finds its application in the technical field of household food preparation appliances.

I claim:

1. Household food preparation appliance comprising: a working container (1) having a bottom wall (3); a rotary working assembly (5, 6, 7) driven by a motor unit; and bearing means secured to, and freely rotatable in relation to, the working assembly, wherein the working assembly comprises a drive shaft (5) capable of supporting a working attachment (7), the working assembly is capable of being positioned in the container (1) with the bearing means substantially against the bottom wall (3) of the container (1), the container has a shaped portion (15) arranged in the bottom wall (3), and the bearing means (8) and the shaped portion together form a means for centering the shaft (5) relative to the bottom wall (3).

2. Appliance according to claim 1 characterized in that the bearing means (8) is formed by a base (9) freely rotatable at the extremity of the working assembly by the intermediary of a journal (10).

3. Appliance according to claim 2 characterized in that the journal (10) is fitted into the base (9).

4. Appliance according to claim 2 characterized in that the base (9) is a disk, made of a supple material.

5. Appliance according to claim 4 wherein the disk is substantially circular.

6. Appliance according to claim 2 characterized in that the base (9) comprises at its lower face, intended to come in contact with the bottom wall (3) of the container (1), a series of notches (18) to increase adherence.

7. Appliance according to claim 2 characterized in that the working assembly comprises a hub (6) in which the journal (10) is freely rotatable.

8. Appliance according to claim 1 characterized in that the working assembly comprises a hub (6), said hub (6) supporting the working attachment.

9. Appliance according to claim 8 wherein the hub (6) is fitted on the extremity of the shaft (5).

10. Appliance according to claim 1 characterized in that the bearing means (8) is formed by a base (9) freely rotatable at the extremity of the working assembly by the intermediary of a journal (10) and the shaped portion is formed by a ring (16) at a different height with respect to the bottom wall (3).

11. Appliance according to claim 10 characterized in that the ring (16) is an integral part of the container (1) and of a dimension and shape adapted to the base (9) so that this base (9) comes to be blocked in a fixed position on the ring (16), by interlocking.

12. Appliance according to claim 1 characterized in that the container (1) is of glass.

13. Household food preparation appliance comprising: a working container (1) having a bottom wall (3) and lateral walls (2); a rotary working assembly (5, 6, 7) driven by a motor unit; and bearing means secured to, and freely rotatable in relation to, the working assembly, wherein the working assembly comprises a drive shaft (5) capable of supporting a working attachment (7), the working assembly is capable of being positioned in the container (1) with the bearing means substantially against the bottom wall (3) of the container (1), and the bearing means (8) are formed to be guided by at least one part of the lateral walls (2) of the container (1) so that the bearing means (8) and the at least one part of the lateral walls (2) of the container (1) together form a means for centering the shaft (5) relative to the bottom wall (3).

14. Appliance according to claim 13 characterized in that the bearing means (8) is formed by a base (9) freely rotatable at the extremity of the working assembly by the intermediary of a journal (10).

15. Appliance according to claim 14 characterized in that the journal (10) is fitted into the base (9).

16. Appliance according to claim 14 characterized in that the base (9) is a disk made of a supple material.

17. Appliance according to claim 16 wherein the disk is substantially circular.

18. Appliance according to claim 14 characterized in that the working assembly comprises a hub (6) in which the journal (10) is freely rotatable.

19. Appliance according to claim 13 characterized in that the working assembly comprises a hub (6), said hub (6) supporting the working attachment.

20. Appliance according to claim 19 wherein the hub (6) is fitted on the extremity of the shaft (5).

21. Appliance according to claim 13 characterized in that the container (1) is of glass.

* * * * *